United States Patent [19]

Chuang

[11] Patent Number: 5,103,855
[45] Date of Patent: Apr. 14, 1992

[54] AUTOMATIC CONDENSATE DRAINING DEVICE FOR COMPRESSED AIR SYSTEMS

[76] Inventor: Chang-Lang Chuang, No. 296, Min-Tsu I Rd., San-Min Dist., Kaohsiung City, Taiwan

[21] Appl. No.: 722,222

[22] Filed: Jun. 27, 1991

[51] Int. Cl.⁵ .............................................. F16T 1/24
[52] U.S. Cl. .................................. 137/195; 137/415
[58] Field of Search ........................ 137/195, 415, 204

[56] References Cited

U.S. PATENT DOCUMENTS

| | | | |
|---|---|---|---|
| 2,998,825 | 9/1961 | Gleason | 137/195 |
| 3,014,687 | 12/1961 | Keisling | 137/204 X |
| 3,262,464 | 7/1966 | Frantz | 137/204 |
| 3,418,789 | 12/1968 | Hoffman | 137/195 X |
| 3,993,090 | 11/1976 | Hankison | 137/195 |
| 4,779,640 | 10/1988 | Cummings | 137/195 |

*Primary Examiner*—Alan Cohan
*Attorney, Agent, or Firm*—Ladas & Parry

[57] ABSTRACT

An automatic condensate draining device includes a housing which confines a condensate collecting chamber and having a base provided with a condensate discharge opening, and a condensate inlet opening in communication with the condensate collecting chamber. A valve seat unit has an axial through opening to intercommunicate the condensate collecting chamber and the condensate discharge opening. A poppet valve has a piston section in sliding contact with the inner surface of a lower portion of a tubular cover member, and a valve head to accordingly block the axial through opening of the valve seat unit. The piston section and the tubular cover member confine a volume variable chamber. Condensate and high pressure air enter the condensate collecting chamber via the condensate inlet opening and force the poppet valve upward so as to enable the valve head to block the condensate discharge opening. When condensate accumulating inside the condensate collecting chamber reaches a predetermined level, air inside the condensate collecting chamber is communicated with the air inside the volume variable chamber so as to move the poppet valve downward and unblock the axial through opening, thereby permitting condensate flow through the condensate discharge opening and thus emptying the condensate collecting chamber.

4 Claims, 5 Drawing Sheets

AUTOMATIC CONDENSATE DRAINING DEVICE FOR COMPRESSED AIR SYSTEMS

BACKGROUND OF THE INVENTION

1. Field of the Invention

This invention relates to an automatic condensate draining device for compressed air systems, more particularly to an air pressure type automatic condensate draining device which can be installed at a level higher or lower than that of the accumulated condensate of the compressed air system.

2. Description of the Related Art

In a conventional compressed air system, it is necessary to provide a cooling process between successive stages because air becomes heated when compressed. Water vapor in the air entering the compressed air system leaves as a superheated vapor and is converted to condensate upon cooling. As the condensate generated by the cooling process accumulates, a condensate draining device must be installed to discharge the condensate and avoid damage to the compressed air system.

Most conventional compressed air systems usually have a manually operated release valve provided at the bottom of the gas cylinder to discharge condensate that has accumulated inside the gas tank. Thus, someone must be assigned to operate and maintain the opening and closing of the release valve to avoid damage to the compressed air system.

Other conventional compressed air systems are fitted with an automatic condensate draining device in order to obviate the need for a manually operated release valve. There are two kinds of automatic condensate draining devices available for this purpose: an electromagnetic type draining device, and the more frequently used, float ball type draining device.

FIG. 1 is an illustration of a conventional float ball type draining device. A hollow casing 100 of the condensate draining device 10 is mounted on a gas tank 20 of a compressed air system at a condensate discharge outlet 21 located at the bottom portion of the gas tank 20. A shaft 12 extends vertically downward inside the hollow casing 100. A lever 11 has a central portion hinged to the shaft 12. A float ball 13 is mounted on one end of the lever 11. A stopper 15 is provided on the other end of the lever 11 to plug the discharge opening 14 of the hollow casing 100. Water vapor converted into condensate flows from the gas tank 20 and accumulates in the hollow casing 100 via the condensate discharge outlet 21. As the condensate level inside the hollow casing 100 rises, the float ball 13 similarly rises. The lever 11 pivots about the shaft 12 to gradually move the stopper 15 away from the discharge opening 14, thereby causing condensate that has accumulated inside the hollow casing 100 to flow out of the same via the discharge opening 14.

One of the disadvantages of using the above described float ball type draining device is that it should be mounted at a level below the condensate discharge outlet of the gas tank. Since the space occupied by the condensate draining device is relatively big (approximately 20 centimeters in height), it cannot be used with conventional small compressed air systems (The space between the bottom edge of the gas tank and the ground is at approximately 10 centimeters). Furthermore, the conventional float ball draining device is of a sealed-type construction, making it difficult to remove dirt and other particles that collects therein and which may eventually block the discharge opening of the condensate draining device.

SUMMARY OF THE INVENTION

Therefore, the main objective of the present invention is to provide an automatic condensate draining device for a compressed air system, which said condensate draining device can be installed at a level higher or lower than that of the accumulated condensate of the compressed air system.

Another objective of the present invention is to provide an automatic condensate draining device which is not electrically powered.

Still another objective of the present invention is to provide an automatic condensate draining device having provisions to make it easy to remove dirt collected therein so as to prevent blockage of the discharge opening thereof.

A further objective of the present invention is to provide a condensate draining device which can be manually or automatically operated.

Accordingly, the preferred embodiment of an automatic condensate draining device of the present invention comprises: a housing including a base and a hollow enclosure having a closed top end and an open bottom end mounted on the base, the base and the enclosure cooperatively confining a condensate collecting chamber, the base having a condensate inlet opening in communication with the condensate collecting chamber and a condensate discharge opening; a valve seat unit having an axial through opening, a top portion extending into the condensate collecting chamber, a bottom portion extending into the condensate discharge opening, a plurality of spaced ribs projecting upwardly from the top portion and a valve seat extending inwardly into the axial through opening at the top portion; an elongated tubular cover member including an upper portion, a lower portion having an inner surface and a bottom periphery seated on the spaced ribs and a divider partitioning the upper and lower portions and being formed with an air inlet opening; a poppet valve having a piston section in sliding contact with the inner surface of the lower portion of the tubular cover member and a valve head extending into the axial through opening of the valve seat unit below the valve seat, the piston section and the divider confining a volume variable chamber; a biasing means to bias the piston section to sit against the spaced ribs and to space the valve head from the valve seat; a stopper provided on top of the divider to block the air inlet opening; and a float means to move the stopper away from the air inlet opening when condensate level inside the condensate collecting chamber reaches a predetermined level. Condensate and high pressure air enter the condensate collecting chamber via the condensate inlet opening and force the poppet valve to move upward against the biasing means so as to enable the valve head to seal the valve seat and prevent condensate from flowing through the condensate discharge opening. When condensate accumulating inside the condensate collecting chamber reaches the predetermined level, the float means moves the stopper away from the air inlet opening so as to equalize air pressure inside the condensate collecting chamber and the volume variable chamber and permit the biasing means to force the piston section of the poppet valve to once more sit against the spaced ribs. Thereby, the valve head is moved away from the valve seat so that condensate that has collected inside the condensate collecting chamber can flow through the axial through opening of the valve seat unit and through the condensate discharge opening and thus empty the condensate collecting chamber.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
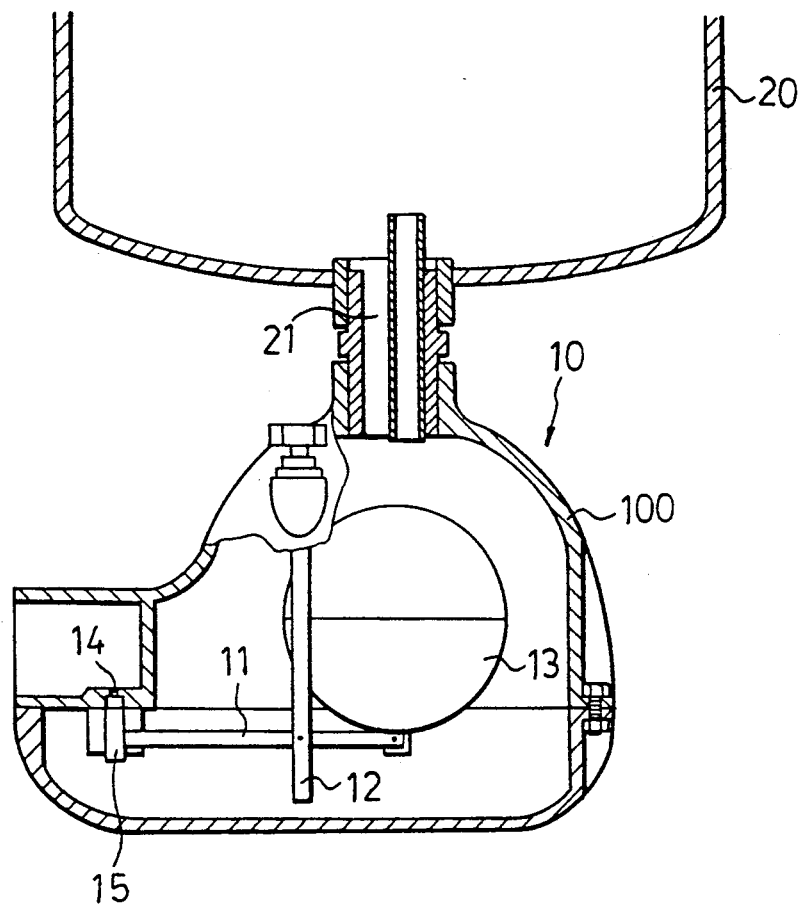
FIG. 1 is a sectional view of a conventional float ball condensate draining device mounted on a gas tank of a compressed air system.
Figure 2:
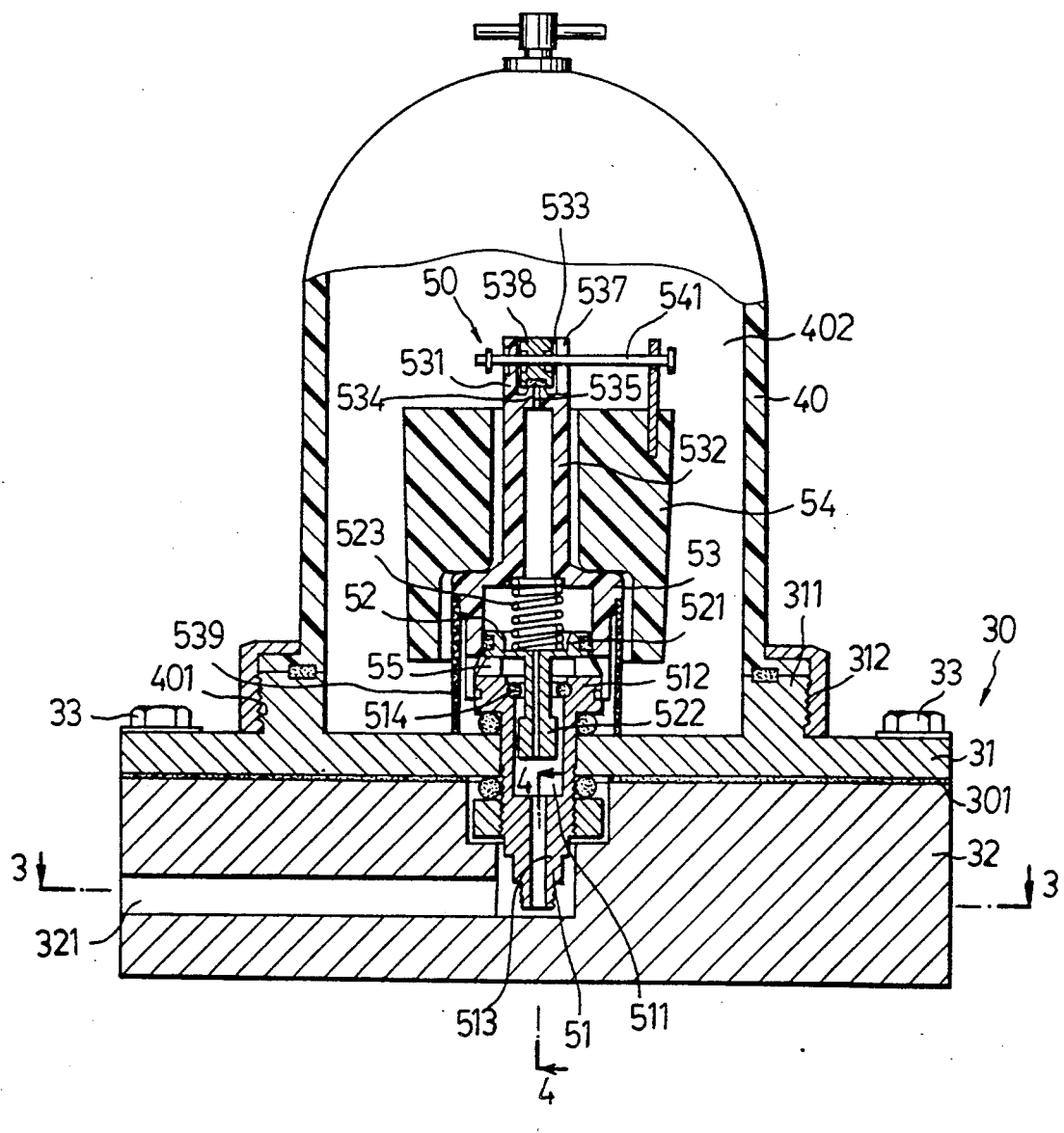
FIG. 2 is a sectional view of the preferred embodiment of an automatic condensate draining device illustrating its assembly.

Referring to FIG. 2, the preferred embodiment of an automatic condensate draining device according to the present invention is shown to comprise a housing including a base 30 and a hollow enclosure 40, and a condensate draining control means 50.

The base 30 includes an upper base member 31 and a lower base member 32. A watertight sheet 301 is clamped between the upper and lower base members, 31 and 32. A plurality of fasteners 33 secure the upper base member 31 on top of the lower base member 33. An annular flange 311 projects upwardly from a central portion of the upper base member 31. The annular flange 311 is provided with an external screw thread 312. The enclosure 40 has a dome shaped closed top end and an open bottom end provided with an internal screw thread 401 that engages the external screw thread 312. The enclosure 40 and the base 30 confine a condensate collecting chamber 402.

The base 30 is provided with a condensate discharge opening 321 in communication with the condensate collecting chamber 402. The condensate draining control means 50 includes a valve seat unit 51, a poppet valve 52, an elongated tubular cover member 53 and a float body 54 pivotally mounted on a top end of the cover member 53. The tubular cover member 53 has an upper portion 531, and a lower portion 532 having an enlarged section with a bottom periphery supported on the valve seat unit 51 at a top portion of the latter. The upper portion 531 confines a plug receiving space 533. A divider 534 partitions the upper and lower portions, 531 and 532, and is provided with an air inlet opening 535. The upper portion 531 is further provided with an axially extending notch 537 disposed adjacent to and above the divider 534. A stopper 538 is provided in the plug receiving space 533 and is seated on top of the divider 534 and acts to seal the air inlet opening 535. The float body 54 is sleeved over the cover device 53 and is attached to one end of a lever 541. The lever 541 extends through the notch 537 and the stopper 538 and has one end pivotally mounted on the upper portion 531. When the float body 54 rises, the lever 541 pivots to move the stopper 538 away from the air inlet opening 535.

The valve seat unit 521 has an axial through opening 511, a top portion 512 extending into the condensate collecting chamber 402 and a lower portion 513 extending into the condensate discharge opening 321. The poppet valve 52 has a piston section 521 which is in sliding contact with the inner surface of the lower portion 532 of the tubular cover member 53. The piston section 521 and the divider 534 confine a volume variable chamber (A). A compression spring 523 is provided in the volume variable chamber (A) between the piston section 521 and the lower portion 532 of the tubular cover member 53 so as to bias the piston section 521 to sit against the valve seat unit 51. The piston section 521 and the lower portion 532 of the tubular cover member 53 are supported on the top portion 512 of the valve seat unit 51 via spaced upwardly extending ribs 55. The poppet valve 52 further has a valve head 522 extending into the axial through opening 511 of the valve seat unit 51. A filter screen 539 is wrapped around the lower portion 532 of the tubular cover member 53 so as to minimize the entry of dirt and other particles into the axial through opening 511 of the valve seat unit 51.

When the preferred embodiment is in an open position, as shown in FIG. 2, the valve head 522 of the poppet valve 52 is displaced from a valve seat ring 514 provided inside the axial through opening 511 of the valve seat unit 51. Condensate that has collected inside the condensate collecting chamber 402 can thus pass through the filter screen 539, through the spaces between the ribs 55, the axial through opening 511 and into the condensate discharge opening 321 so as to discharge the condensate inside the condensate collecting chamber 402.

Figure 3:
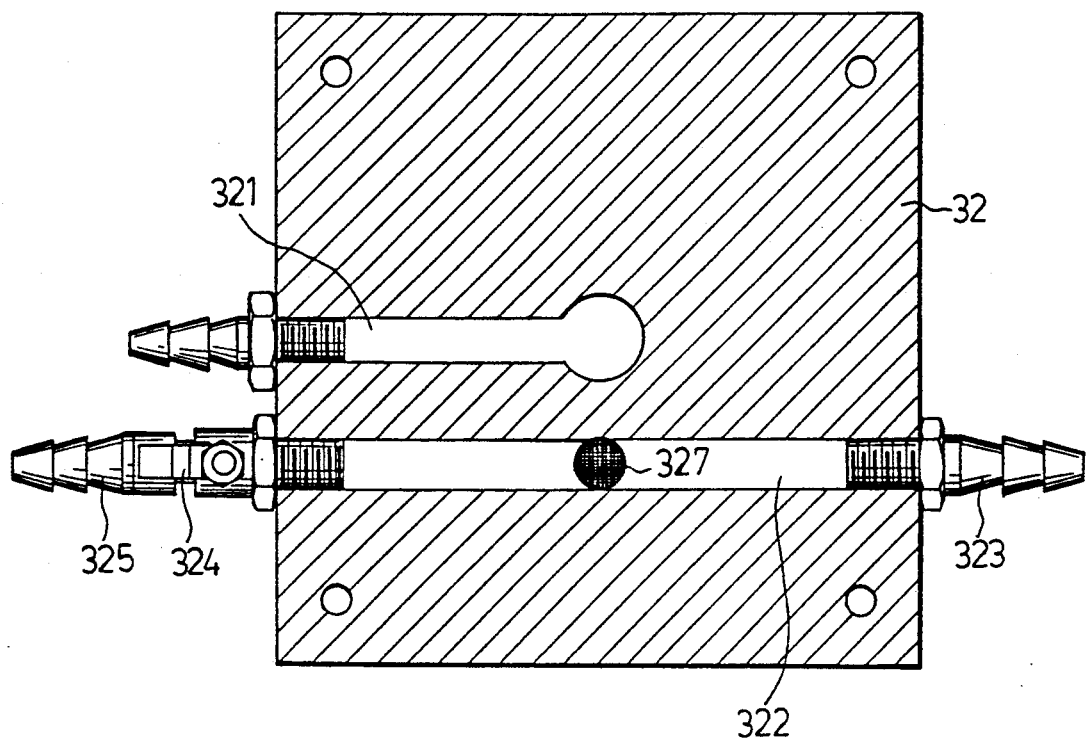
FIG. 3 is a horizontal section of a lower base member of the automatic condensate draining device shown in FIG. 2.

FIG. 3 is a section of the lower base member 32 taken along a horizontal plane. The lower base member 32 is provided with a lateral through opening 322. A condensate inlet port 323 is provided on one end of the through opening 322. A condensate outlet port 325 is provided on the opposite end of the through opening 322. The condensate outlet port 325 has a control valve 324 that selectively prevents high pressure air, condensate or both which flow into the condensate inlet port 323 from discharging through the condensate outlet port 325

Figure 4:
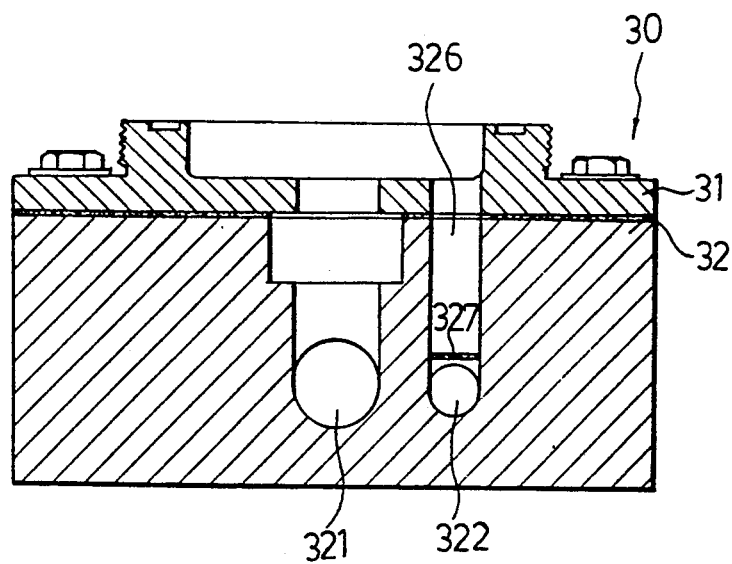
FIG. 4 is a vertical section of a base of the automatic condensate draining device shown in FIG. 2.

FIG. 4 is a section through the base 30 taken along a vertical plane. A guide hole 326 extends through the upper and lower base members, 31 and 32, to communicate the condensate collecting chamber 402 and the through opening 322. High pressure air, condensate or both entering the condensate inlet port 323 thus flow into the condensate collecting chamber 402 via the guide hole 326. A filter screen 327 is provided on the guide hole 326 to minimize the entry of unwanted particles into the condensate collecting chamber 402.

Figure 5:
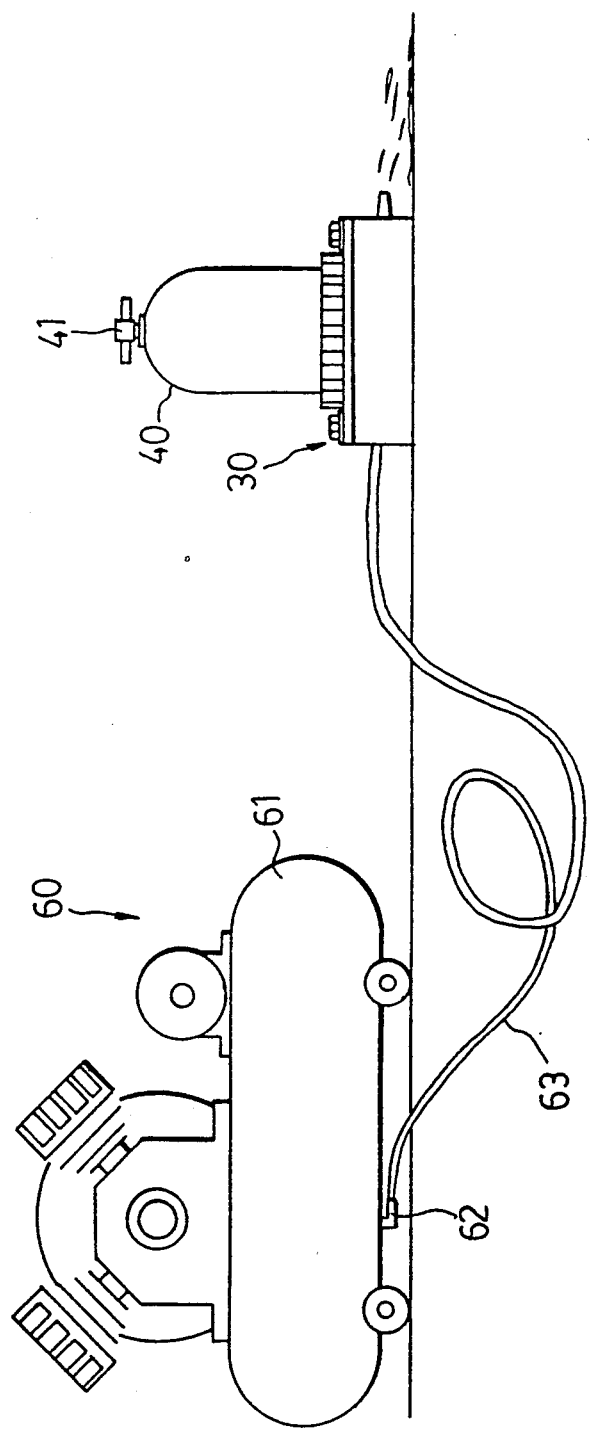
FIG. 5 is a layout of the preferred embodiment when used with a compressed air system.

FIG. 5 is an illustration of the preferred embodiment when attached to a compressed air system 60. The compressed air system 60 has a gas tank 61 provided with a gas discharge port 62 on a bottom side thereof. A tube 63 connects the gas discharge port 62 to the preferred embodiment.

Figure 6:
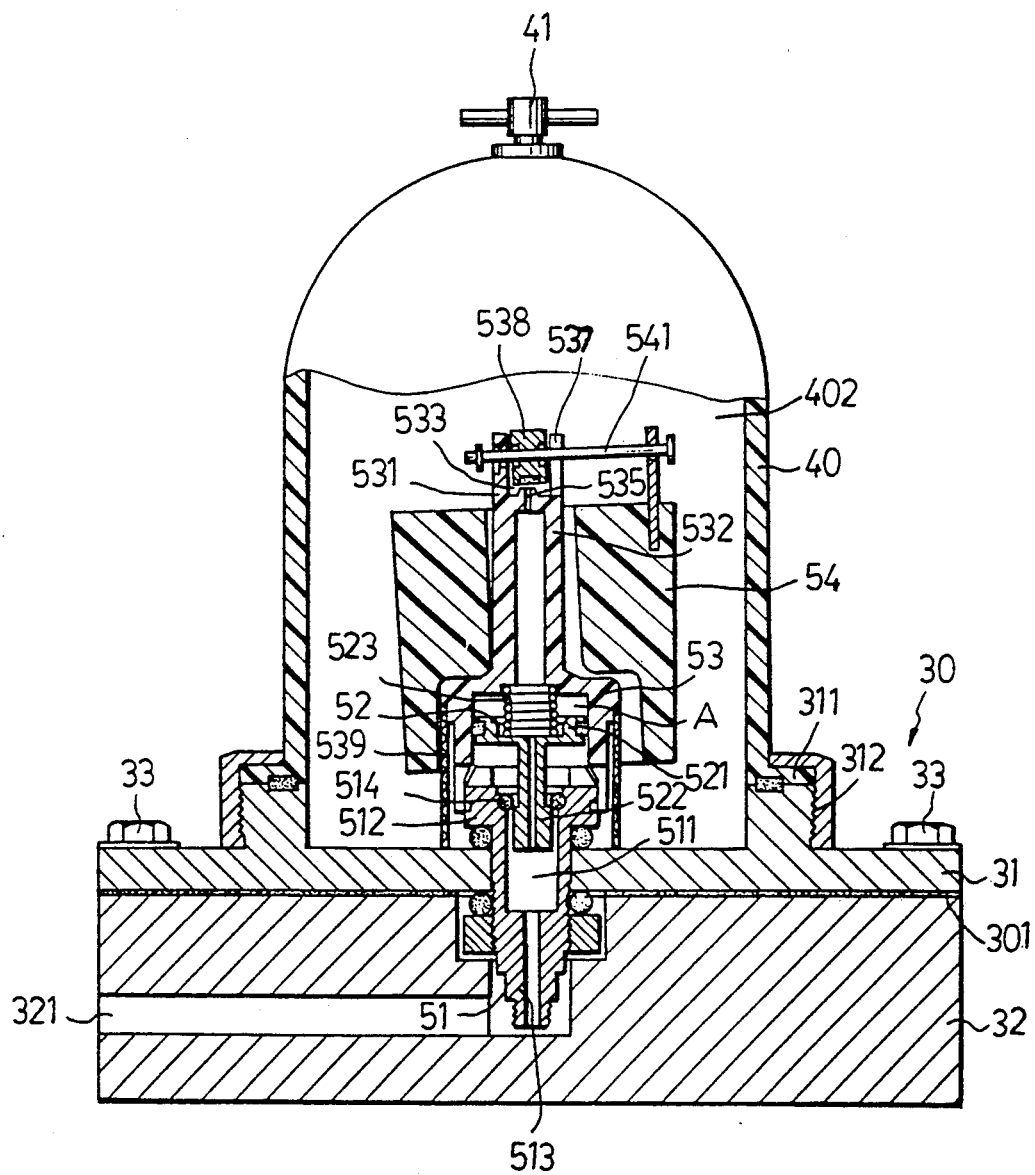
FIG. 6 is a sectional view of the assembled preferred embodiment illustrating its operation.

Referring to FIGS. 3, 5 and 6, high pressure air from the gas tank 61 fills the condensate collecting chamber 402 via the tube 63, the through opening 322 and the guide hole 326. The pressure inside the condensate collecting chamber 402 gradually builds up and eventually becomes greater than the pressure inside the volume variable chamber (A). The air inside the condensate collecting chamber 402 forces the poppet valve 52 to move upwards against the action of the compression spring 523. The valve head 522 abuts against the valve seat ring 514 to prevent fluid flow through the condensate discharge opening 321.

As the high pressure air from the gas tank 60 begins to cool, condensate begins to accumulate inside the condensate collecting chamber 402. When condensate inside the condensate collecting chamber 402 reaches a predetermined level, the float body 54 gradually rises to cause the lever 541 to pivot and lift the stopper 538 away from the air inlet opening 535. Air inside the condensate collecting chamber 402 then enters the air inlet opening 535 to mix with the air inside the volume variable chamber (A), thereby equalizing the air pressure inside the condensate collecting chamber 402 and the air pressure inside the volume variable chamber (A). The compression spring 523 expands to force the poppet valve 52 to once more sit against the ribs 55 of the valve seat unit 51, and thereby move the valve head 522 away from the valve seat ring 514, as shown in FIG. 2. Condensate that has collected inside the condensate collecting chamber 402 flows through the axial through opening 511 of the valve seat unit 51 and through the condensate discharge opening 321 so as to empty the condensate collecting chamber 402.

An air pressure control valve 41 is mounted on the closed top end of the enclosure 40. The purpose of the air pressure control valve 41 is to keep the air pressure inside the condensate collecting chamber 402 lower than the air pressure inside the gas tank 61. Under this condition, condensate inside the gas tank 61 is forced by the high pressure air therein to flow into the condensate collecting chamber 402. If the air pressure inside the condensate collecting chamber 402 is equal to or greater than that inside the gas tank 61, the transfer of condensate from the gas tank 61 to the condensate collecting chamber 402 is not possible. By adjusting the air pressure inside the condensate collecting chamber 402, the air pressure control valve 41 can also be used to control the condensate flow rate into the condensate collecting chamber 402.

Referring once more to FIG. 3, whenever breakdown of the automatic features of the preferred embodiment occurs, draining of condensate can be accomplished manually. The control valve 324 at the condensate outlet port 325 is opened so that high pressure air, condensate or both flowing into the condensate inlet port 323 can be discharged through the condensate outlet port 325. No condensate can accumulate inside the condensate collecting chamber 402 at this stage. The accompanying high pressure air flowing into the through opening 322 also washes away dirt collected therein. This facilitates quick removal of collected dirt.

The differences and advantages of the preferred embodiment over the conventional electromagnetic type and float ball type draining devices are as follows:

1. Both the preferred embodiment and the conventional electromagnetic type draining device use high pressure air to discharge condensate from the gas tank, unlike the conventional float ball type draining device. The preferred embodiment and the conventional float ball type draining device use a float device to control the discharge procedure, while the conventional electromagnetic type draining device uses an electromagnetic control valve to control the discharge procedure.

2. The preferred embodiment, like the conventional float ball type draining device, does not require electric power, unlike the conventional electromagnetic type draining device.

3. The preferred embodiment, like the conventional electromagnetic type draining device, can be positioned at a level higher or lower than that of the accumulated condensate of the compressed air system.

4. The preferred embodiment employs high pressure air to facilitate the removal of collected dirt. The conventional float ball type draining device is of a sealed-type construction, making it difficult to remove dirt and other particles collected therein which may eventually result in blockage. The conventional electromagnetic type draining device requires periodic manual cleaning of the valve openings.

5. The preferred embodiment can be both automatically and manually operated.

6. The rate of condensate flow for the preferred embodiment can be adjusted, unlike those for conventional condensate draining devices.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. An automatic condensate draining device, comprising:
    a housing including a base and a hollow enclosure having a closed top end and an open bottom end mounted on said base, said base and said enclosure cooperatively confining a condensate collecting chamber, said base having a condensate inlet opening in communication with said condensate collecting chamber, and a condensate discharge opening;
    a valve seat unit having an axial through opening, a top portion extending into said condensate collecting chamber, a bottom portion extending into said condensate discharge opening, a plurality of spaced ribs projecting upwardly from said top portion, and a valve seat extending inwardly into said axial through opening at said top portion;
    an elongated tubular cover member including an upper portion, a lower portion having an inner surface and a bottom periphery seated on said spaced ribs and a divider partitioning said upper and lower portions and being provided with an air inlet opening;
    a poppet valve having a piston section in sliding contact with said inner surface of said lower portion of said tubular cover member, and a valve head extending into said axial through opening of said valve seat unit below said valve seat, said piston section and said divider confining a volume variable chamber;
    a biasing means to bias said piston section to sit against said spaced ribs and to space said valve head from said valve seat;
    a stopper provided on top of said divider to block said air inlet opening; and
    a float means to move said stopper away from said air inlet opening when condensate level inside said condensate collecting chamber reaches a predetermined level, said float means comprising an axially extending notch formed in said upper portion of said tubular cover member adjacent to and above said divider, a lever having a first end pivotally mounted on said tubular cover member and a second end extending through said stopper and said notch, and a float body attached to said second end of the said lever;

whereby, condensate and high pressure air enter said condensate collecting chamber via said condensate inlet opening and force said poppet valve to move upward against biasing means so as to enable said valve head to seal said valve seat and prevent condensate from flowing through said condensate discharge opening; when condensate accumulating inside condensate collecting chamber reaches said predetermined level, said float means moves said stopper away from said air inlet opening so as to equalize air pressure inside said condensate collecting chamber and said volume variable chamber and permit said biasing means to force said piston section of said poppet valve to once more sit against said spaced ribs and thereby move said valve head away from said valve seat so that condensate collected inside said condensate collecting chamber flows through said axial through opening of said valve seat unit and through said condensate discharge opening so as to empty said condensate collecting chamber.

2. The automatic condensate draining device as claimed in claim 1, wherein said float body is provided around said tubular cover member.

3. The automatic condensate draining device as claimed in claim 1, wherein said base further has a condensate outlet opening in direct communication with said condensate inlet opening, said automatic condensate draining device further comprising a control valve mounted on said base at said condensate outlet opening and being manually operated so that condensate and high pressure air flowing into said condensate inlet opening can be discharged through said condensate outlet opening.

4. The automatic condensate draining device as claimed in claim 1, further comprising an air pressure control valve means provided on said closed top end of said enclosure so as to adjust air pressure inside said condensate collecting chamber and control flow rate into said condensate collecting chamber.

* * * * *